(12) United States Patent
Xia et al.

(10) Patent No.: US 12,401,836 B2
(45) Date of Patent: Aug. 26, 2025

(54) VIDEO SWITCHING METHOD AND APPARATUS, STORAGE MEDIUM, AND DEVICE

(71) Applicant: Huawei Technologies Co., Ltd., Shenzhen (CN)

(72) Inventors: Lu Xia, Shenzhen (CN); Dechun Fang, Shanghai (CN); Qingshan Deng, Shanghai (CN); Wenjin Zou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 18/260,192

(22) PCT Filed: Dec. 31, 2021

(86) PCT No.: PCT/CN2021/143821
§ 371 (c)(1),
(2) Date: Jun. 30, 2023

(87) PCT Pub. No.: WO2022/148319
PCT Pub. Date: Jul. 14, 2022

(65) Prior Publication Data
US 2024/0064346 A1    Feb. 22, 2024

(30) Foreign Application Priority Data
Jan. 5, 2021  (CN) .......................... 202110008033.0

(51) Int. Cl.
*H04N 7/173*   (2011.01)
*G06T 7/70*    (2017.01)
(Continued)

(52) U.S. Cl.
CPC ......... *H04N 21/23424* (2013.01); *G06T 7/70* (2017.01); *G06V 10/245* (2022.01);
(Continued)

(58) Field of Classification Search
CPC ....... H04N 21/41407; H04N 21/47205; H04N 21/44008; H04N 21/23424; H04N 21/854; G06V 10/74; G06V 10/44; G06V 10/245
See application file for complete search history.

(56) References Cited

U.S. PATENT DOCUMENTS 6,636,220 B1    10/2003  Szeliski et al.
10,650,539 B2 *  5/2020  Yan ..................... G06V 40/168
(Continued)

FOREIGN PATENT DOCUMENTS

CN    102254336 A    11/2011
CN    102306290 A    1/2012
(Continued)

OTHER PUBLICATIONS

CN 111491124 B—English translation version (Year: 2023).*
(Continued)

*Primary Examiner* — Gigi L Dubasky
(74) *Attorney, Agent, or Firm* — Conley Rose, P.C.

(57) ABSTRACT

A video switching method includes a target object being selected. A similarity of the target object between a first image frame and a second image frame is calculated to obtain a similarity value, where the first image frame is from a first video, and the second image frame is from a second video; to-be-switched image frames are obtained, where the to-be-switched image frames include the first image frame and the second image frame with the similarity value greater than or equal to a preset threshold; and the first image frame of the first video is switched to the second image frame of the second video or the second image frame of the second video is switched to the first image frame of the first video based on the to-be-switched image frames.

20 Claims, 11 Drawing Sheets

(51) Int. Cl.
  *G06V 10/24* (2022.01)
  *G06V 10/44* (2022.01)
  *G06V 10/74* (2022.01)
  *G06V 40/16* (2022.01)
  *H04N 21/234* (2011.01)

(52) U.S. Cl.
  CPC ............ *G06V 10/44* (2022.01); *G06V 10/761* (2022.01); *G06V 40/171* (2022.01)

(56) References Cited

U.S. PATENT DOCUMENTS

| | | | |
|---|---|---|---|
| 2017/0094193 A1 | 3/2017 | Adsumilli et al. | |
| 2018/0082126 A1* | 3/2018 | Proctor | G11B 27/28 |
| 2018/0233175 A1 | 8/2018 | Nir et al. | |
| 2018/0268207 A1* | 9/2018 | Kim | G06T 7/269 |
| 2020/0134875 A1* | 4/2020 | Yi | G06F 18/28 |
| 2020/0413152 A1* | 12/2020 | Todorovic | H04N 21/41265 |
| 2021/0134009 A1 | 5/2021 | Zhang et al. | |
| 2021/0183013 A1 | 6/2021 | Deng | |
| 2021/0201068 A1* | 7/2021 | Zhang | G06V 10/44 |

FOREIGN PATENT DOCUMENTS

| | | | | |
|---|---|---|---|---|
| CN | 106534967 A | 3/2017 | | |
| CN | 108197555 A | 6/2018 | | |
| CN | 110390263 A | 10/2019 | | |
| CN | 110675433 A | 1/2020 | | |
| CN | 111061914 A | 4/2020 | | |
| CN | 111062289 A | 4/2020 | | |
| CN | 111294644 A | 6/2020 | | |
| CN | 111460219 A | 7/2020 | | |
| CN | 111970562 A | 11/2020 | | |
| CN | 111491124 B | * | 2/2023 | ....... H04N 21/44008 |

OTHER PUBLICATIONS

Kevin Dale et al., Multi-Video Browsing and Summarization, 2012 IEEE Compiter Society Conference on Computer Vision and Pattern Recognition Workshops, Jun. 21, 2012, total 8 pages.

* cited by examiner

VIDEO SWITCHING METHOD AND APPARATUS, STORAGE MEDIUM, AND DEVICE

CROSS-REFERENCE TO RELATED APPLICATIONS

This is a National Stage of International Patent Application No. PCT/CN2021/143821 filed on Dec. 31, 2021, which claims priority to Chinese Patent Application No. 202110008033.0 filed on Jan. 5, 2021, both of which are hereby incorporated by reference in their entireties.

TECHNICAL FIELD

This application relates to the video field, and in particular, to a video switching method and apparatus, a storage medium, and a device.

BACKGROUND

With the emergence of short videos, an increasing quantity of people begin to accept the short videos and use short videos to record and share emotions in life. In an actual application scenario, due to diversified requirements, a user usually expects to combine a plurality of video clips with different scenarios to achieve a better switching effect, thereby bringing quite cool switching experience. However, currently, the switching action is mainly implemented by manual editing by a post-production person.

SUMMARY

This application provides a video switching method, so that video switching can be performed based on a target object without manual editing by a post-production person. The technical solutions are as follows.

According to a first aspect, a video switching method is provided. The method includes: determining a target object; calculating a similarity of the target object between a first image frame and a second image frame to obtain a similarity value, where the first image frame is from a first video, and the second image frame is from a second video; obtaining to-be-switched image frames, where the to-be-switched image frames include the first image frame and the second image frame with the similarity value greater than or equal to a preset threshold; and switching the first image frame of the first video to the second image frame of the second video or switching the second image frame of the second video to the first image frame of the first video based on the to-be-switched image frames.

In this embodiment of this application, a similarity between two image frames is calculated to automatically align images, so as to implement video switching, and manual editing by a post-production person is not required, thereby facilitating use by a user.

Optionally, the calculating a similarity of the target object between a first image frame and a second image frame to obtain a similarity value includes: obtaining features of the target object in the first image frame and the second image frame; and calculating a distance between the features of the target object in the first image frame and the second image frame to obtain the similarity value.

Optionally, the features of the target object include a facial feature of the target object and/or a body posture feature of the target object.

Optionally, the method further includes: providing an editing interface, where the editing interface includes an object presented after the first image frame and the second image frame are recognized; and the determining a target object includes: determining the target object in response to a selection of a user.

Optionally, the editing interface further includes one or more pairs of to-be-switched image frames for selection by the user; and the switching the first image frame of the first video to the second image frame of the second video or switching the second image frame of the second video to the first image frame of the first video based on the to-be-switched image frames includes: in response to one or more pairs of to-be-switched image frames selected by the user, switching the first image frame of the first video to the second image frame of the second video or switching the second image frame of the second video to the first image frame of the first video based on the one or more pairs of to-be-switched image frames.

According to a second aspect, a video switching apparatus is provided. The apparatus includes: a determining module, configured to determine a target object; a calculation module, configured to calculate a similarity of the target object between a first image frame and a second image frame to obtain a similarity value, where the first image frame is from a first video, and the second image frame is from a second video; an obtaining module, configured to obtain to-be-switched image frames, where the to-be-switched image frames include the first image frame and the second image frame with the similarity value greater than or equal to a preset threshold; and a switching module, configured to switch the first image frame of the first video to the second image frame of the second video or switch the second image frame of the second video to the first image frame of the first video based on the to-be-switched image frames.

Optionally, the calculation module is specifically configured to: obtain features of the target object in the first image frame and the second image frame; and calculate a distance between the features of the target object in the first image frame and the second image frame to obtain the similarity value.

Optionally, the features of the target object include a facial feature of the target object and/or a body posture feature of the target object.

Optionally, the apparatus further includes: an editing module, configured to provide an editing interface, where the editing interface includes an object presented after the first image frame and the second image frame are recognized; and the determining module is specifically configured to: determine the target object in response to a selection of a user.

Optionally, the editing interface further includes one or more pairs of to-be-switched image frames for selection by the user; and the switching module is specifically configured to: in response to one or more pairs of to-be-switched image frames selected by the user, switch the first image frame of the first video to the second image frame of the second video or switch the second image frame of the second video to the first image frame of the first video based on the one or more pairs of to-be-switched image frames.

According to a third aspect, this application further provides an electronic device. A structure of the electronic device includes a processor and a memory. The memory is configured to: store a program that supports the electronic device in performing the video switching method provided in the first aspect and the optional implementations of the first aspect, and store data used to implement the video switching method provided in the first aspect and the optional implementations of the first aspect. The processor executes the program stored in the memory to perform the method provided in the first aspect and the optional implementations of the first aspect. The electronic device may further include a communication bus, and the communication bus is configured to establish a connection between the processor and the memory.

According to a fourth aspect, this application further provides a computer-readable storage medium. The computer-readable storage medium stores instructions. When the instructions are run on a computer, the computer is enabled to perform the video switching method in the first aspect and the optional implementations of the first aspect.

Technical effects achieved in the second aspect, the third aspect, and the fourth aspect are similar to technical effects achieved by using corresponding technical means in the first aspect. Details are not described herein again.

Beneficial effects brought by the technical solutions provided in this application include at least the following.

In embodiments of this application, the target object is determined, and the similarity of the target object between the first image frame and the second image frame is calculated to obtain the similarity value, where the first image frame is from the first video, and the second image frame is from the second video. If the similarity value is greater than or equal to the preset threshold, a pair of to-be-switched image frames is obtained based on the first image frame and the second image frame, and the first video and the second video are switched based on the to-be-switched image frames, so that an image switching effect is achieved quite conveniently.

DESCRIPTION OF MAIN REFERENCE NUMERALS

200—electronic device; 110—processor; 120—external memory interface; 121—internal memory; 130—USB interface; 140—charging management module; 141—power management module; 142—battery; 1—antenna; 2—antenna; 150—mobile communication module; 160—wireless communication module; 170—audio module; 170A—speaker; 170B—receiver; 170C—microphone; 170D—headset jack; 180—sensor module; 193—camera; 194—display screen; 195—video codec; 100—video switching apparatus; 10—determining module; 20—calculation module; 30—obtaining module; 40—switching module; 50—editing module; 501—Dock bar; 510—home screen; 511—status bar; 512—video import interface; 513—object presentation interface; 711—image frame switching interface; 712—first image frame display interface; and 713—second image frame display interface.

DESCRIPTION OF EMBODIMENTS

To make the objectives, technical solutions, and advantages of this application clearer, the following further describes the implementations of this application in detail with reference to the accompanying drawings.

Before embodiments of this application are described in detail, application scenarios in embodiments of this application are first described.

Currently, an increasing quantity of users start to create and share short videos on social platforms. When creating a short video, a user wishes to combine a plurality of video clips into one video to switch between video scenarios. However, in the conventional technology, manual processing is performed by a video post-production person. To be specific, to-be-switched image frames are found through frame-by-frame search in the plurality of video clips, and images of the found image frames are sorted to implement switching. For a common user, if the user does not have a corresponding video editing tool or video editing technology, the user cannot create a video with a switching effect, and post-production manual editing and synthesis of the video are labor-consuming.

Based on this, a video switching method provided in embodiments of this application may be used to automatically perform video switching, so as to lower a requirement of video switching production on a technical capability of a user.

An embodiment of this application provides a video switching method. The method is performed by a video switching apparatus. Functions of the video switching apparatus may be implemented by a software system, or may be implemented by a hardware device, or may be implemented by a combination of a software system and a hardware device.

Figure 1:
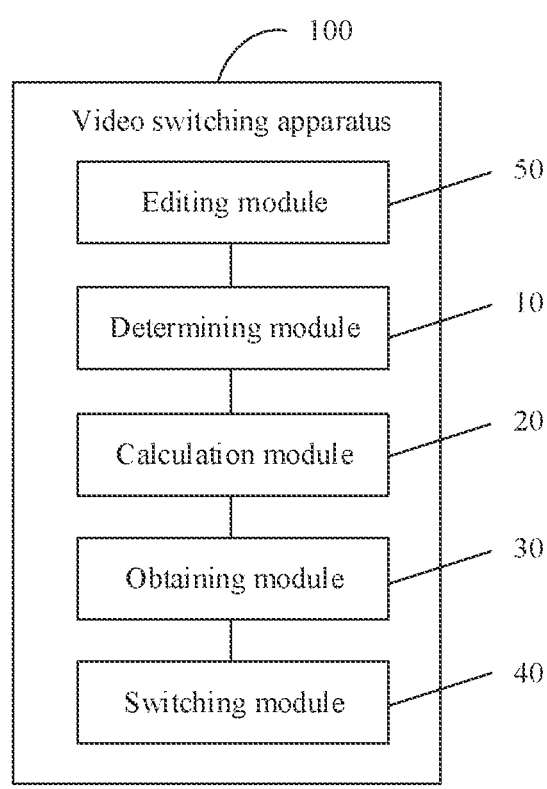
FIG. 1 is a schematic diagram of a structure of a video switching apparatus according to an embodiment of this application.

When the video switching apparatus is a software apparatus, with reference to FIG. 1, the video switching apparatus 100 may be logically divided into a plurality of modules, and each module may have a different function. The function of each module is implemented by a processor in an electronic device by reading and executing a computer instruction in a memory. A structure of the electronic device may be an electronic device shown in FIG. 2 below. For example, the video switching apparatus 100 may include a determining module 10, a calculation module 20, an obtaining module 30, and a switching module 40. In a specific implementation, the video switching apparatus 100 may perform content described in the following steps S40 to S44, steps S61 and S62, and steps S81 to S85. It should be noted that, in this embodiment of this application, only a structure and functional modules of the video switching apparatus 100 are divided by using an example, but specific division is not limited.

The determining module 10 is configured to determine a target object. The determined target object is used for subsequent video switching, and video switching is implemented by aligning the target object. A video may be understood as including a series of image frames, which are displayed at a given frame rate, and a single image frame, namely, an image, may be obtained by stopping at a particular frame of a sequence. The video may include an object. For example, the video may be a video file recorded for a specific object, and the object may be a life body, such as a person or an animal, or may be a static article, such as a book or a television. For example, the video may be a video recorded for a moving human body. Image recognition is performed on an image frame in the video, to recognize an object included in the image frame. In actual application, image frames in the video may be obtained frame by frame, and image recognition is performed on the obtained image frames, to obtain an object included in the video. A plurality of image frames in the video may be further obtained. For example, a video including a specific video object may be obtained, and then a plurality of image frames are captured from the video. For example, a plurality of image frames at the first second, the $20^{th}$ second, the $34^{th}$ second, and the like in the video may be captured, where each image frame corresponds to one piece of specific time information. For another example, a plurality of image frames may alternatively be captured from the video based on a specific time interval. For example, the video may be captured every 10 seconds, and a plurality of image frames at the first second, the $11^{th}$ second, the $21^{st}$ second, and the like in the video are captured. The recognized object may include a person A, a person B, a cat C, a television D, and the like. The target object may be determined based on a selection of the user. For example, an object recognized on an editing interface is presented to the user, and the user determines the target object. Alternatively, an object that meets a specific condition in an image frame may be considered as the target object by default. For example, an object that is located in the middle of a picture and that is in the image frame is considered as the target object by default.

The calculation module 20 is configured to calculate a similarity of the target object between a first image frame and a second image frame to obtain a similarity value. The first image frame is from a first video, and the second image frame is from a second video. The calculation module 20 is configured to calculate the similarity of the target object between each first image frame in the first video and each second image frame in the second video. For example, if the first video has three first image frames, and the second video has three second image frames, nine similarity values may be obtained. Video switching may be performed on one or more video clips. For example, when video switching is performed on a video clip, two video clips are obtained by clipping the video clip based on different scenarios, to obtain the first video and the second video. The first video includes a plurality of first image frames, and the second video includes a plurality of second image frames. To calculate similarities of the target object between the first image frames and the second image frames, a particular first image frame in the first video may be first obtained, then similarities of the target object between the first image frame and all the second image frames in the second video are calculated, then a next first image frame in the first video is obtained, and then similarities of the target object between the next first image frame and all the second image frames in the second video are calculated. By analogy, all the first image frames in the first video are calculated.

The obtaining module 30 is configured to obtain to-be-switched image frames, where the to-be-switched image frames include the first image frame and the second image frame with the similarity value greater than or equal to a preset threshold. If the similarity value is greater than or equal to the preset threshold, the to-be-switched image frames are obtained based on the first image frame and the second image frame. If the similarity value of the target object between the first image frame and the second image frame is greater than or equal to the preset threshold, a pair of to-be-switched image frames is obtained. The to-be-switched image frames include the first image frame and the second image frame. The pair of to-be-switched image frames may be understood as a position of switching between the first video and the second video, or a position of connection between the first video and the second video. To be specific, after the first image frame of the first video is displayed, the second image frame of the second video is switched to, or after the second image frame of the second video is displayed, the first image frame of the first video is switched to. Based on that the similarity value of the target object between the first image frame and the second image frame is greater than or equal to the preset threshold, it may be considered that the similarity of the target object between the first image frame and the second image frame is high. In this case, when video switching is performed, the target object in the first image frame and the target object in the second image frame are aligned, so that the user can focus on the target object and ignore a change of another object. In addition, the similarity of the target object is high, so that a video switching effect is smooth and natural.

The switching module 40 is configured to switch the first image frame of the first video to the second image frame of the second video or switch the second image frame of the second video to the first image frame of the first video based on the to-be-switched image frames, so as to implement switching between the first video and the second video based on the to-be-switched image frames. The to-be-switched image frames of the first video and the second video are positioned based on the to-be-switched image frames. To be specific, the to-be-switched image frame of the first video is the first image frame in the to-be-switched image frames, and the to-be-switched image frame of the second video is the second image frame in the to-be-switched image frames. The first image frame and the second image frame may be combined, to implement switching between the first video and the second video. Alternatively, the first image frame and the second image frame are connected together, so that after the first image frame is played and displayed, the next image frame is the second image frame, or after the second image frame is played and displayed, the next image frame is the first image frame.

Optionally, the video switching apparatus 100 may further include an editing module 50. The editing module 50 is configured to provide an editing interface for a user. The editing interface includes an object for selection by the user, and the object includes an object recognized after image recognition is performed on each image frame in the video. To be specific, the video switching apparatus 100 recognizes an object on which video switching is to be performed, and presents the recognized object by using the editing interface, so that the user can select the target object from the object presented on the editing interface. The editing interface further includes one or more pairs of to-be-switched image frames for selection by the user. After calculating the similarity of the target object between the first image frame of the first video and the second image frame of the second video, the video switching apparatus 100 may obtain a plurality of pairs of to-be-switched image frames. To be specific, video switching may be performed at a plurality of positions in the first video and the second video. Video switching may be performed based on the selected to-be-switched image frames. For example, if two pairs of to-be-switched image frames are selected, after the first video is switched to the second video, the second video may be further switched to the first video.

In addition, in some possible cases, some of the plurality of modules included in the video switching apparatus 100 may also be combined into one module. For example, the obtaining module 30 and the switching module 40 may be combined into a video switching module.

In this embodiment of this application, the video switching apparatus 100 described above may be flexibly deployed. For example, the video switching apparatus 100 may be deployed on an electronic device, and may be a software apparatus deployed on a server or a virtual machine in a cloud data center. The software apparatus may be used for video switching. The electronic device may include a mobile phone, a tablet computer, a smartwatch, a tablet computer, a laptop portable computer, an in-vehicle computer, a desktop computer, a wearable device, or the like.

Figure 2:
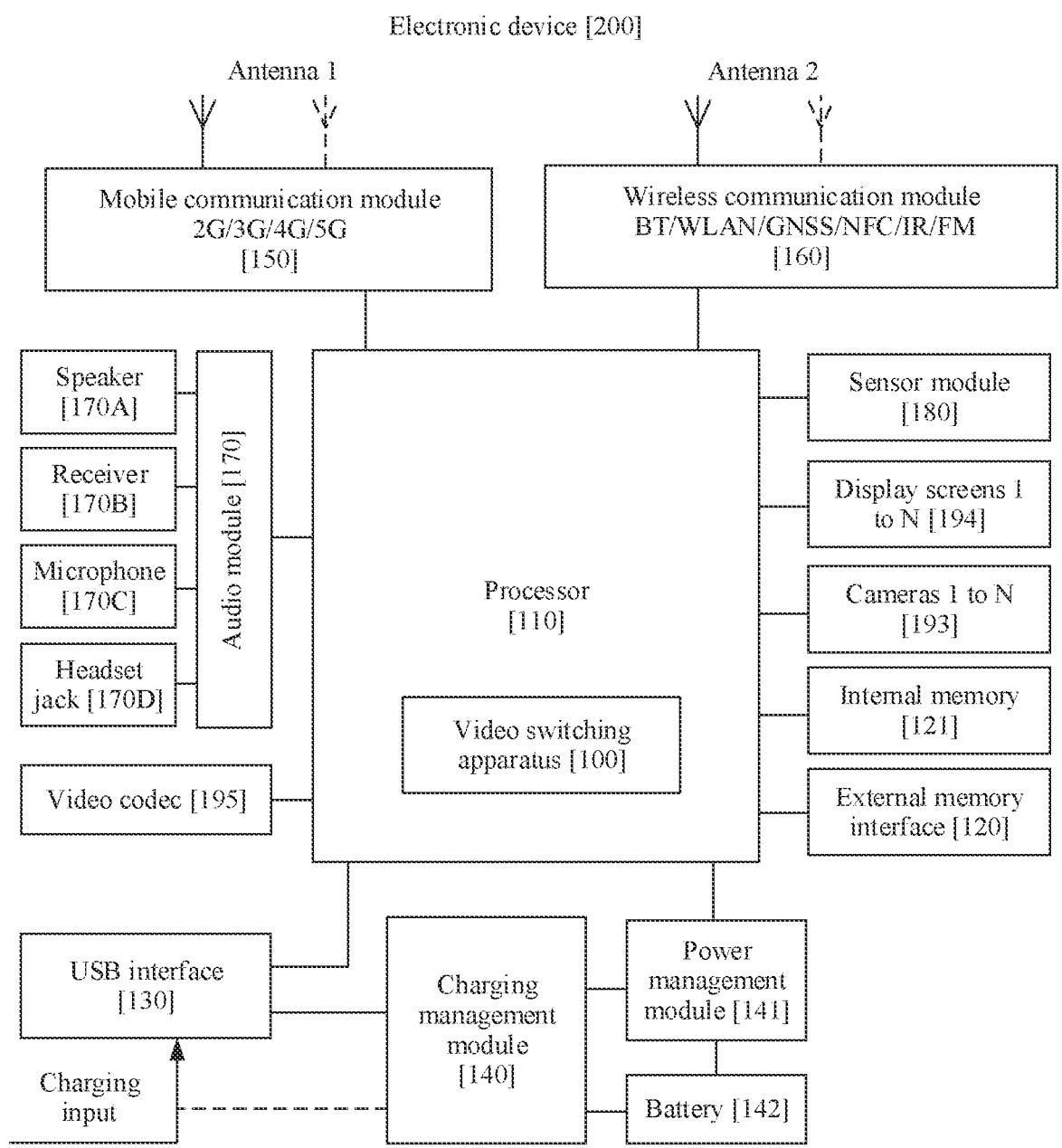
FIG. 2 is a schematic diagram of a structure of an electronic device according to an embodiment of this application.

With reference to FIG. 2, a mobile phone is used as an example of the electronic device. A person skilled in the art may understand that the mobile phone shown in FIG. 2 is merely an example, and does not constitute a limitation on the mobile phone. The mobile phone may have more or fewer components than those shown in the figure.

For example, FIG. 2 is a schematic diagram of a structure of an electronic device according to an embodiment of this application.

The electronic device 200 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a camera 193, a display screen 194, and the like.

It may be understood that the structure shown in this embodiment of the present invention does not constitute a specific limitation on the electronic device 200. In some other embodiments of this application, the electronic device 200 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec 195, a digital signal processor (digital signal processor, DSP), a baseband processor, and/or a neural-network processing unit (neural-network processing unit, NPU). Different processing units may be independent devices, or may be integrated into one or more processors.

A memory may be further disposed in the processor 110, and is configured to store computer instructions and data. In some embodiments, the memory in the processor 110 is a cache memory. The memory may store computer instructions or data that has just been used or cyclically used by the processor 110. If the processor 110 needs to use the computer instructions or data again, the processor 110 may directly invoke the computer instructions or data from the memory. This avoids repeated access, and reduces waiting time of the processor 110. Therefore, system efficiency is improved.

In some embodiments, the video switching apparatus 100 runs in the processor 110, and the processor 110 reads and executes related computer instructions to implement a function of each module in the video switching apparatus 100, thereby implementing video switching. In another embodiment, the video switching apparatus 100 may be deployed in the memory, and the processor 110 reads and executes computer instructions from the memory to implement video switching.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from a charger. The charger may be a wireless charger or a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device 200. When charging the battery 142, the charging management module 140 may further supply power to the electronic device 200 by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display screen 194, the camera 193, the wireless communication module 160, and the like. The power management module 141 may be further configured to monitor parameters such as a battery capacity, a quantity of battery cycles, and a battery health status (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 200 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 200 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution applied to the electronic device 200 for wireless communication including 2G/3G/4G/5G wireless communication. The mobile communication module 150 may include one or more filters, one or more switches, one or more power amplifiers, one or more low noise amplifiers (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation by using the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display screen 194. In some embodiments, the modem processor may be an independent device. In some other embodiments, the modem processor may be independent of the processor 110, and disposed in a same device as the mobile communication module 150 or another functional module.

The wireless communication module 160 may provide a solution applied to the electronic device 200 for wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, and the like. The wireless communication module 160 may be one or more devices integrating one or more communication processing modules. The wireless communication module 160 receives an electromagnetic wave by using the antenna 2, performs frequency modulation and filtering on the electromagnetic wave signal, and sends a processed signal to the processor 110. The wireless communication module 160 may further receive a to-be-sent signal from the processor 110, perform frequency modulation and amplification on the to-be-sent signal, and convert the signal into an electromagnetic wave for radiation by using the antenna 2.

In some embodiments, in the electronic device 200, the antenna 1 is coupled to the mobile communication module 150, and the antenna 2 is coupled to the wireless communication module 160, so that the electronic device 200 can communicate with a network and another device by using a wireless communication technology. The wireless communication technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time-division code division multiple access (time-division code division multiple access. TD-SCDMA), long term evolution (long term evolution, LTE), BT, GNSS, WLAN, NFC, FM, and/or IR technologies, and the like. The GNSS may include a global positioning system (global positioning system. GPS), a global navigation satellite system (global navigation satellite system, GLONASS), a BeiDou navigation satellite system (BeiDou navigation satellite system. BDS), a quasi-zenith satellite system (quasi-zenith satellite system. QZSS), and/or a satellite based augmentation system (satellite based augmentation systems, SBAS).

The electronic device 200 implements a display function by using the GPU, the display screen 194, the application processor, and the like. The GPU is a microprocessor for image processing, and is connected to the display screen 194 and the application processor. The GPU is configured to: perform mathematical and geometric calculation, and render an image. The processor 110 may include one or more GPUs that execute program instructions to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 200 may include one or N display screens 194, where N is a positive integer greater than 1. The electronic device 200 may implement a photographing function by using the ISP, the camera 193, the video codec 195, the GPU, the display screen 194, the application processor, and the like. The ISP is configured to process data fed back by the camera 193. For example, when photographing is performed, a shutter is opened, light is transferred to a camera photosensitive element through a lens, an optical signal is converted into an electrical signal, and the camera photosensitive element transmits the electrical signal to the ISP for processing, and the electrical signal is converted into an image visible to naked eyes. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semi-conductor, CMOS) phototransistor. The photosensitive element converts the optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the electronic device 200 may include one or N cameras 193, where N is a positive integer greater than 1.

The digital signal processor is configured to process a digital signal, and may process another digital signal in addition to the digital image signal. For example, when the electronic device 200 performs frequency channel selection, the digital signal processor is configured to perform Fourier transform on frequency energy and the like.

The video codec 195 is configured to compress or decompress a digital video. The electronic device 200 may support one or more video codecs 195. In this way, the electronic device 200 may play or record videos in a plurality of coding formats, for example, moving picture experts group (moving picture experts group, MPEG) 1, MPEG 2, MPEG 3, and MPEG 4.

The external memory interface 120 may be configured to connect to an external memory card, for example, a Micro SD card, to expand a storage capability of the electronic device 200. The external memory card communicates with the processor 110 by using the external memory interface 120, to implement a data storage function. For example, files such as music and videos are stored in the external storage card.

The internal memory 121 may be configured to store one or more computer programs, and the one or more computer programs include instructions. The processor 110 may run the foregoing instructions stored in the internal memory 121, so that the electronic device 200 performs the video switching method provided in some embodiments of this application, various function applications, data processing, and the like. The internal memory 121 may include a program storage area and a data storage area. The program storage area may store an operating system. The program storage area may further store one or more applications (for example. Gallery and Contacts), and the like. The data storage area may store data (for example, photos and contacts) created during use of the electronic device 200, and the like. In addition, the internal memory 121 may include a high-speed random access memory, and may further include a non-volatile memory, such as one or more disk storage devices, a flash device, or a universal flash storage (universal flash storage, UFS). In some other embodiments, the processor 110 runs the instructions stored in the internal memory 121 and/or the instructions stored in the memory disposed in the processor, so that the electronic device 200 performs the video switching method provided in embodiments of this application, various function applications, and data processing.

The electronic device 200 may implement an audio function, for example, video playing or recording by using the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110. The speaker 170A, also referred to as a "loudspeaker", is configured to convert an audio electrical signal into a sound signal. The electronic device 200 may listen to music or answer a hands-free call by using the speaker 170A. The receiver 170B, also referred to as an "earpiece", is configured to convert an electrical audio signal into a sound signal. When the electronic device 200 answers a call or receives voice information, the receiver 170B may be put close to a human ear to listen to voice. The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. One or more microphones 170C may be disposed in the electronic device 200. In some other embodiments, two microphones 170C may be disposed in the electronic device 200, to collect a sound signal and further implement a noise reduction function. In some other embodiments, three, four, or more microphones 170C may alternatively be disposed in the electronic device 200, to collect a sound signal, reduce noise, recognize a sound source, implement a directional recording function, and the like. The headset jack 170D is configured to connect to a wired headset. The headset jack 170D may be a USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. The touch sensor may be disposed on the display screen. The touch sensor and the display screen form a touchscreen that is also referred to as a "touch screen".

In addition, the electronic device 200 may further include one or more components such as a key, a motor, an indicator, and a SIM card interface. This is not limited in this embodiment of this application.

When the video switching apparatus is a hardware device, the video switching apparatus may be the electronic device 200 described above, and includes the display screen 194, the processor 110, and the internal memory 121. The internal memory 121 may exist independently, and is connected to the processor 110 by using a communication bus. The internal memory 121 may also be integrated with the processor 110. The internal memory 121 may store computer instructions. When the computer instructions stored in the internal memory 121 are executed by the processor 110, the model optimization method in this application may be implemented. In addition, the internal memory 121 may further store data required by the processor in a process of performing the video switching method in this embodiment of this application and intermediate data and/or result data generated in the process.

Figure 3:
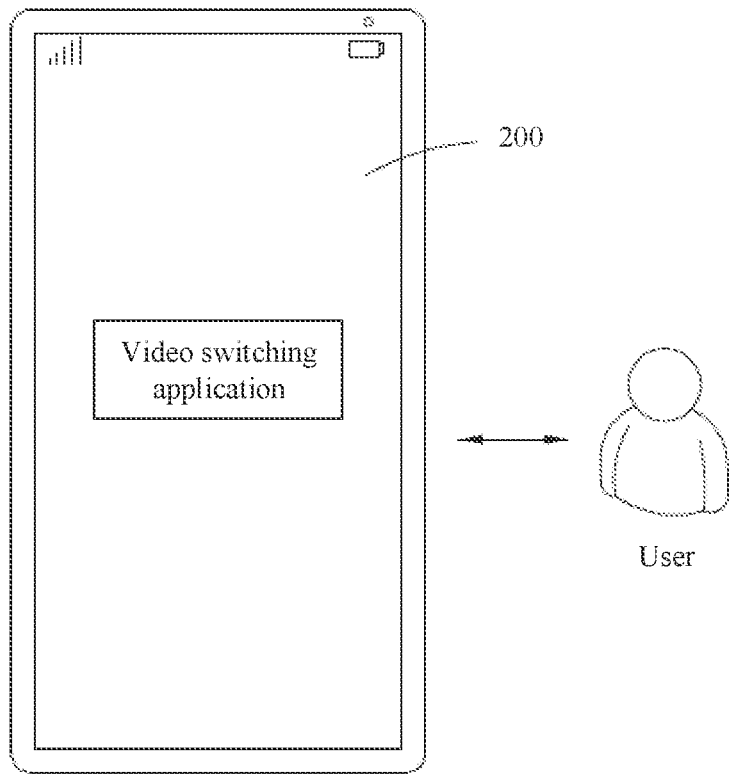
FIG. 3 is a schematic diagram of application of a video switching apparatus according to an embodiment of this application.

For example, FIG. 3 is a schematic diagram of application of a video switching apparatus according to this application. As shown in FIG. 3, an electronic device supplier or an application supplier may abstract a function provided by the video switching apparatus 100 into an application, for example, a video switching application. The electronic device supplier installs the video switching application on the electronic device 200, or the application supplier provides the video switching application for a user to purchase. After purchasing the electronic device 200, the user may use the video switching application installed on the electronic device 200, or may download the video switching application online, and the user uses the video switching application to perform video switching.

The following describes a video switching method provided in an embodiment of this application.

Figure 4:
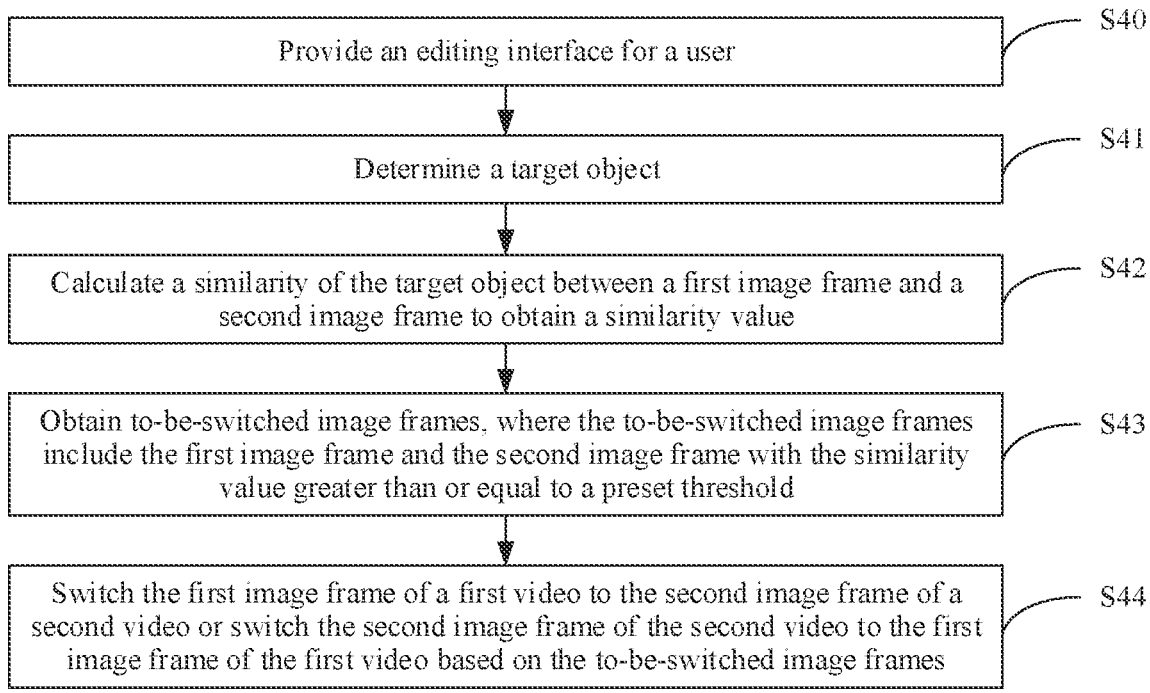
FIG. 4 is a schematic flowchart of a video switching method according to an embodiment of this application.

FIG. 4 is a flowchart of a video switching method according to an embodiment of this application. The video switching method may be performed by the foregoing video switching apparatus. With reference to FIG. 4, the method includes the following steps.

Step S40: Provide an editing interface for a user.

Figure 5A:
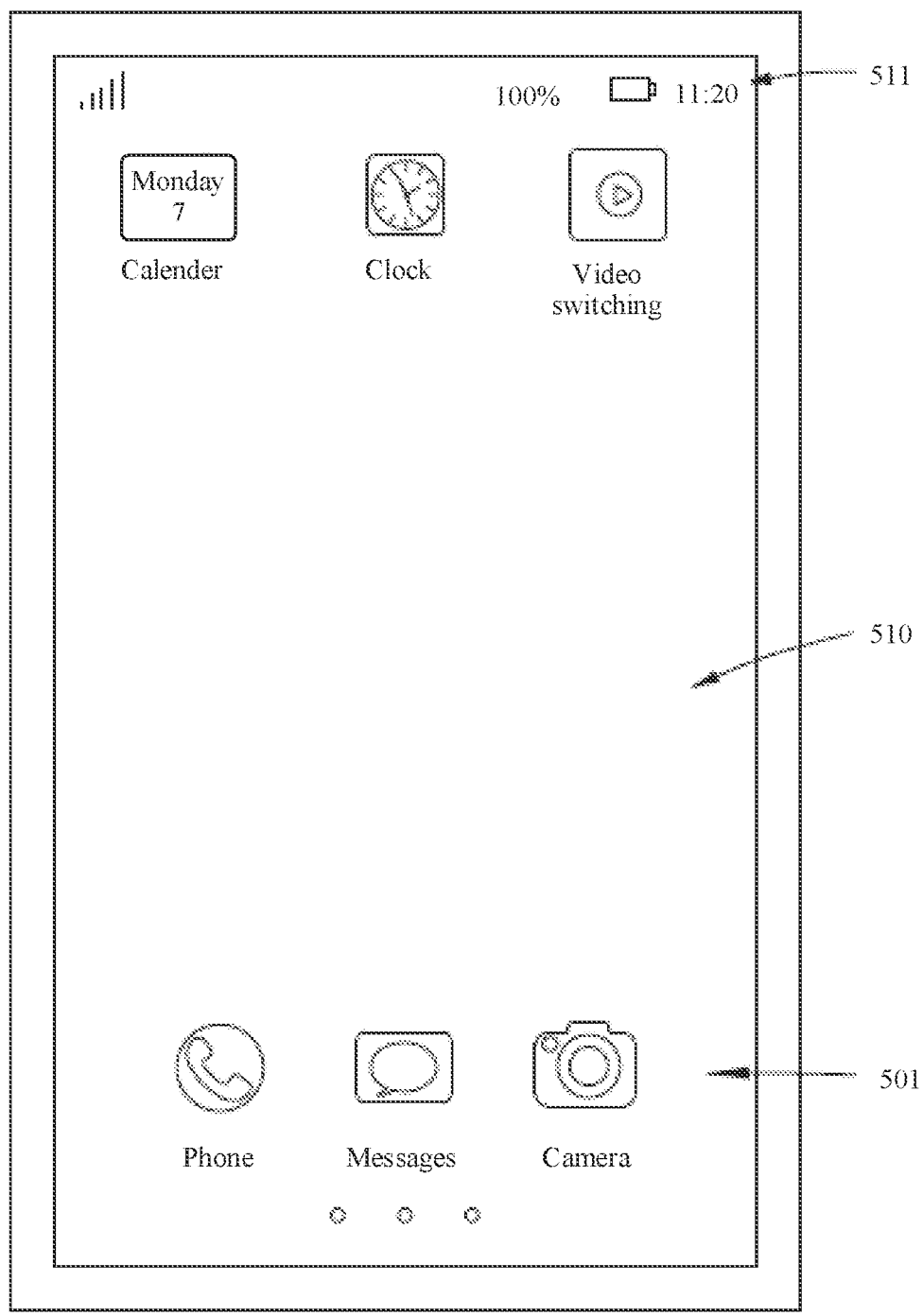
FIG. 5a is a schematic diagram of an interaction interface according to an embodiment of this application.

In this embodiment of this application, a function of the video switching apparatus is abstracted as a video switching application. For example, the video switching application is installed on a mobile phone. As shown in FIG. 5a, an interface of the mobile phone includes a status bar 511, a home screen 510, and a Dock bar 501. The status bar 511 may include a name of an operator (for example, China Mobile), time, signal strength, a current battery level, and the like. The following content of the status bar 511 is similar, and details are not described herein again. The home screen 510 includes applications, and the applications include embedded applications and downloadable applications. As shown in FIG. 5a, the home screen 510 includes Calendar, Clock, and a video switching application, and the like. The Dock bar 501 includes common applications, such as Phone, Messages, and Camera.

Figure 5B:
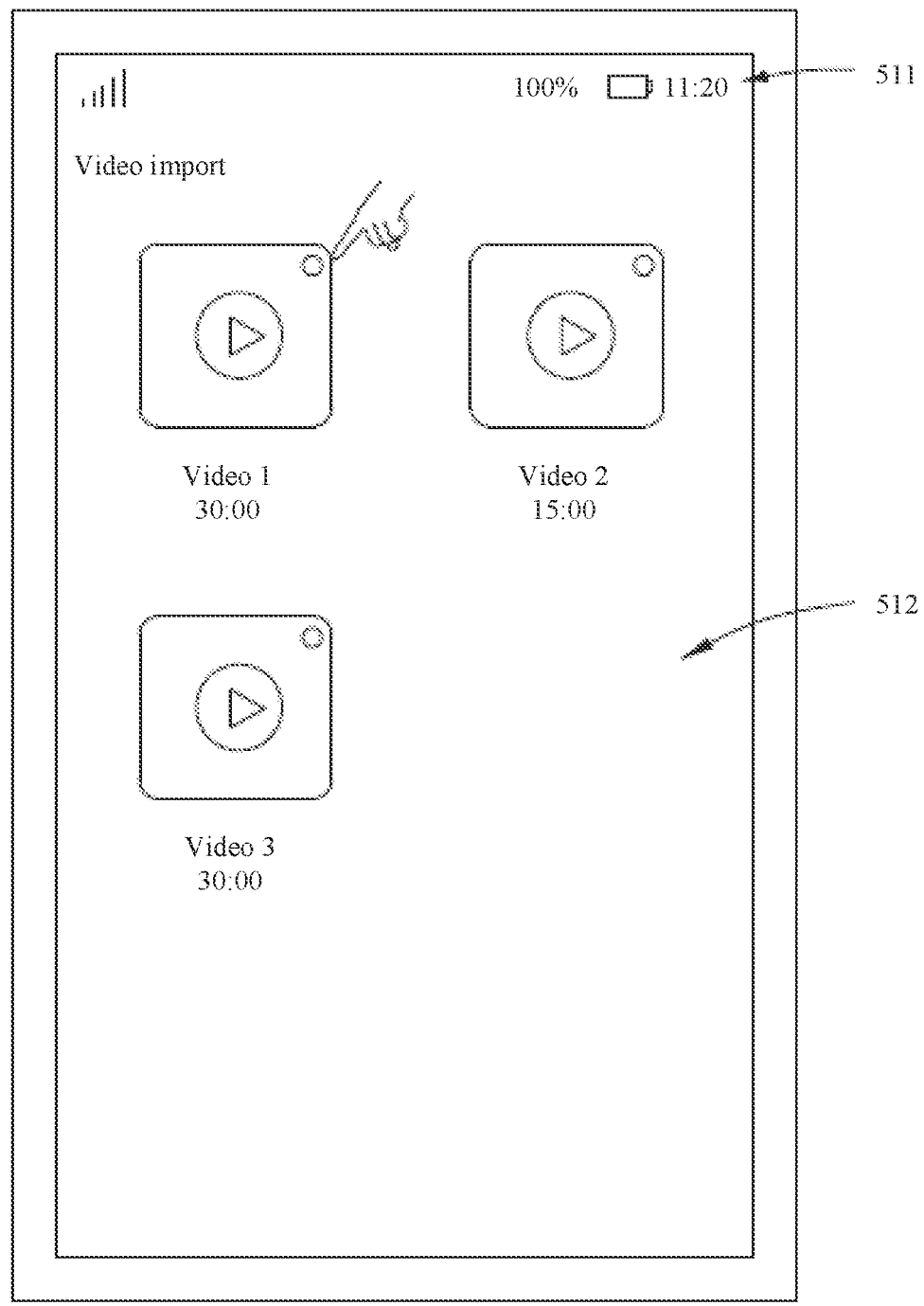
FIG. 5b is a schematic diagram of a video import interface according to an embodiment of this application.

The user taps a "video switching" icon on the home screen 510 to enter the video switching application. The video switching application presents an editing interface, and the editing interface includes a video import interface 512 (as shown in FIG. 5b). The user may import, by using the video import interface 512, a to-be-processed video that the user wants to edit, to implement video switching. The user may obtain the to-be-processed video by reading a video in a gallery on the mobile phone, or obtain the to-be-processed video by photographing by using a camera, or download a corresponding to-be-processed video by using a web page. This is not specifically limited in this application. As shown in FIG. 5b, videos for selection by the user are presented on the video import interface 512, including a video 1, a video 2, and a video 3. Content of each video clip is different, and duration may also be different. For example, duration of the video 1 is 30 minutes, duration of the video 2 is 15 minutes, and duration of the video 3 is 30 minutes. In an embodiment, duration of the videos may be the same. The user may select one video clip or a plurality of video clips. When selecting one video clip, the user may clip the video clip into two or more video clips based on recognition of a scenario in the video. Alternatively, the user determines a clipping position and a quantity of videos obtained through clipping. It may be understood that if the user selects a video clip to perform video switching, a target object in the video clip is the same, but scenarios are different. It may be understood that the scenario includes an object other than the target object, and the object other than the target object includes, for example, a person, and a background environment. The background environment may include, for example, a grassland, an indoor environment, a sky, and a static object. For example, if the user shoots a video clip, and a scenario in the video changes from indoor to outdoor, the video clip may be clipped into an indoor video and an outdoor video.

The user taps the video 1 and the video 3 in FIG. 5b, and selects the video 1 and the video 3 as to-be-processed videos. The video 1 and the video 3 may be videos of a same dance by a same dancer that are shot at a same angle. Objects in the video 1 and the video 3 are the same dancer, but clothes, makeups, or hairstyles of the dancer are different. Scenarios in the video 1 and the video 3 are also different. The video 1 is a first video, and the video 2 is a second video. It may be understood that the video 2 may be further selected as the to-be-processed video. In other words, a quantity of to-be-processed videos is not limited to two, and the quantity of the to-be-processed videos is not specifically limited in this application.

After the to-be-processed video is determined, the video switching apparatus performs image processing on an image frame in the to-be-processed video, to recognize an object in an image frame image. In actual application, image frames in the video may be obtained frame by frame, and image recognition is performed on the obtained image frames, to obtain the object in the video. A plurality of image frames in the video may be further obtained. For example, a video including a specific video object may be obtained, and then a plurality of image frames are captured from the video. For example, a plurality of image frames at the first second, the $11^{th}$ second, the $20^{th}$ second, the $34^{th}$ second, and the like in the video may be captured, where each image frame corresponds to one piece of specific time information. For another example, a plurality of image frames may alternatively be captured from the video based on a specific time interval. For example, the video may be captured every 10 seconds, and a plurality of image frames at the first second, the $11^{th}$ second, the $21^{st}$ second, and the like in the video are captured.

Figure 5C:
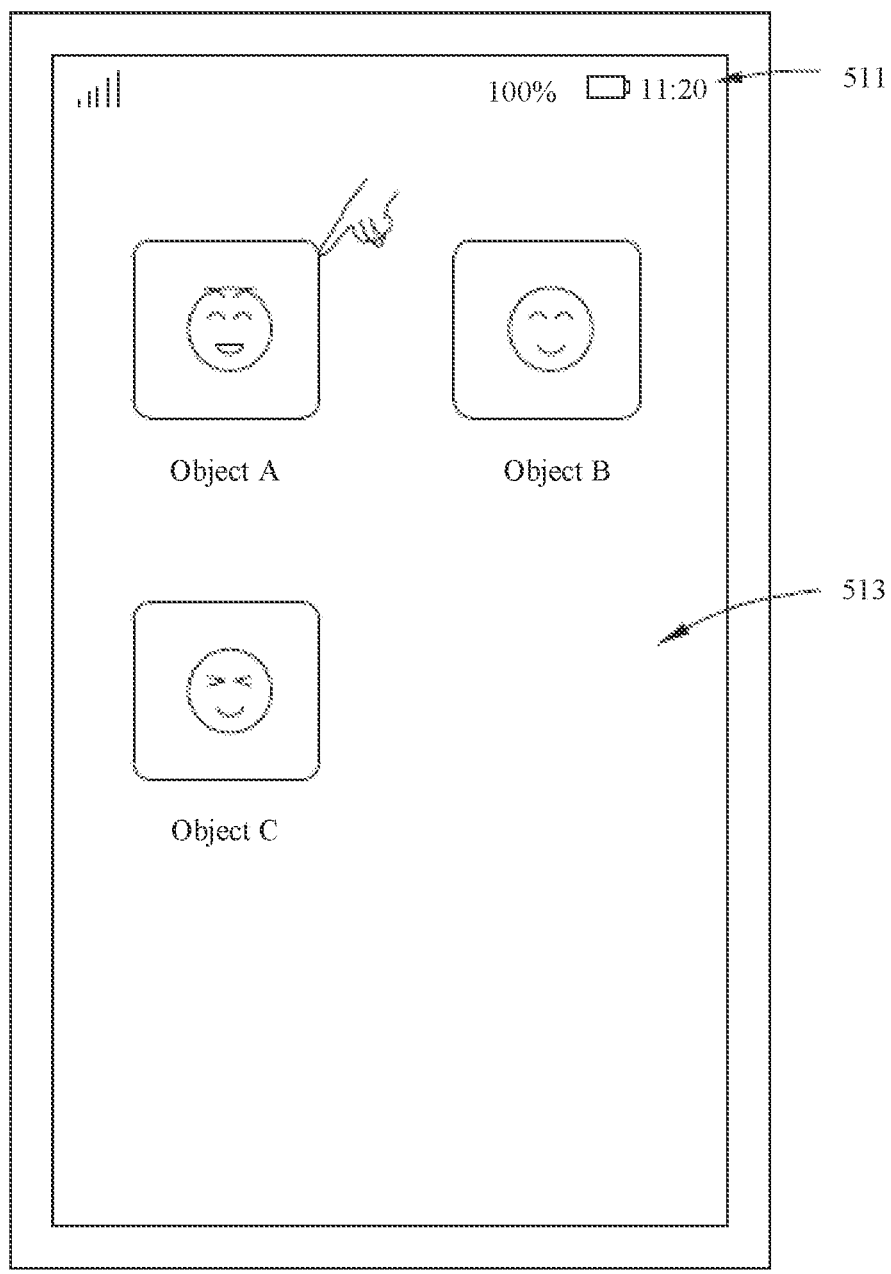
FIG. 5c is a schematic diagram of an object presentation interface according to an embodiment of this application.

For the video 1 and the video 2, life bodies in the video 1 and the video 2 are recognized. Based on three dancers appearing in the video 1 and the video 2, as shown in FIG. 5c, the editing interface may further include an object presentation interface 513. The object presentation interface 513 presents recognition results of objects in the to-be-processed videos, including faces of an object A, an object B, and an object C. It may be understood that the object A, the object B. and the object C are objects recognized after image recognition is performed on image frames in the video 1 and the video 2. The object presentation interface 513 may present a face or an entire person. To be specific, the image frame of the video 1 includes the object A and/or the object B and/or the object C, the image frame of the video 2 includes the object A and/or the object B and/or the object C, and after image recognition is performed on all image frames of the video 1 and the video 2, the recognized objects include the object A, the object B, and the object C. A quantity of the recognized objects is not limited, and the quantity of the recognized objects is determined by an actual quantity of objects in the videos.

It may be understood that, when the user selects a video clip from the video import interface 512, the video switching apparatus clips the video clip to obtain a plurality of video clips. In this case, the to-be-processed videos are the plurality of video clips that are obtained through clipping, and the video switching apparatus filters image frames, of a same person that has a same posture expression and a same body posture expression, that have a particular time interval. Because the person has quite close expressions and postures within a specific time, to achieve a best effect, the filtered image frames need to be within a particular time interval.

Step S41: Determine the target object.

In this embodiment of this application, when object recognition is performed on a particular image frame, a plurality of objects may be recognized, and image frame switching is implemented by aligning target objects. The user may select an object by itself, to determine the target object, or the video switching apparatus may automatically determine the target object. When the target object is a person, the video switching apparatus may filter, based on the target person, image frames, of a same target person that has a same posture expression and a same body posture expression, that are in the first image frame and the second image frame.

In this embodiment of this application, the image frames in the first video may be processed frame by frame to perform facial recognition, and whether a face is the target object is determined by using RGB data of the face in the image frame in combination with a facial recognition algorithm. Processing of the image frames in the second video is similar, and details are not described herein again. For example, for the first image frame, a face rectangular box may be obtained after an RGB image in the first image frame is processed, and then a face in the face rectangular box is recognized by using a facial recognition technology. For example, the face may be labeled by using a face ID technology, to determine a person to which the face belongs in the video, and then determine the target object in the first image frame. Processing of the second image frame is similar, and details are not described herein again.

In this embodiment of this application, as shown in FIG. 5c, the object presentation interface 513 presents the object A, the object B, and the object C. The user may tap the object A, to determine the object A as the target object. In a possible implementation, the video switching apparatus may automatically determine an object located in a center of the image frame picture as the target object.

Step S42: Calculate a similarity of the target object between the first image frame and the second image frame to obtain a similarity value.

In this embodiment of this application, a first image frame A1 in the first video may be first obtained, and then the first image frame A1 is compared with all second image frames in the second video. For example, a second image frame B1 in the second video is selected, a similarity of the target object between the first image frame A1 and the second image frame B1 is calculated, and then a next second image frame B2 in the second video is obtained, to calculate a similarity of the target object between the first image frame A1 and the second image frame B2. By analogy, similarities of the target object between the first image frame and all the second image frames in the second video are calculated. Alternatively, a second image frame B1 in the second video may be first obtained, and then the second image frame B1 is compared with all first image frames in the first video. For example, a first image frame A1 in the first video is selected, a similarity of the target object between the first image frame A1 and the second image frame B1 is calculated, and then a next first image frame A2 in the first video is obtained, to calculate a similarity of the target object between the first image frame A2 and the second image frame B1. By analogy, the similarity of the target object between the first image frame and the second image frame is calculated.

Figure 6:
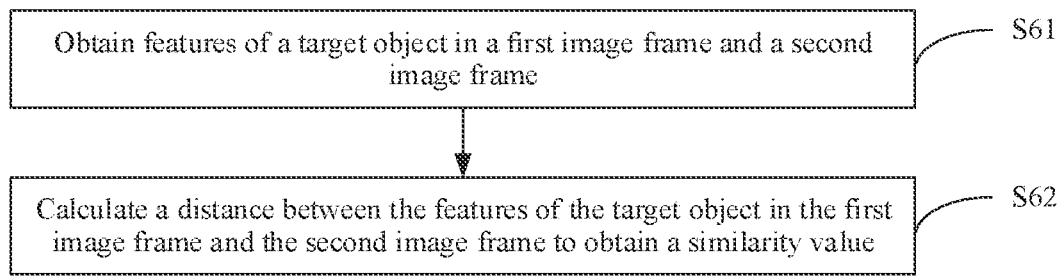
FIG. 6 is a flowchart of another video switching method according to an embodiment of this application.

With reference to FIG. 6 at the same time, the similarity of the target object may be calculated in the following manner, to obtain the similarity value.

Step S61: Obtain features of the target object in the first image frame and the second image frame.

Step S62: Calculate a distance between the features of the target object in the first image frame and the second image frame to obtain the similarity value.

In this embodiment of this application, the features of the target object, such as a facial feature and/or a body posture feature of the target object, may be obtained. For example, one or more of two-dimensional features, three-dimensional features, and a face mesh of a face may be obtained, and a distance between the two-dimensional features of the face in the first image frame and the two-dimensional features of the face m the second image frame is calculated to obtain a distance measure, so as to obtain the similarity value based on the distance measure. Alternatively, a distance between the three-dimensional features of the face in the first image frame and the three-dimensional features of the face in the second image frame may be calculated to obtain a distance measure, so as to obtain the similarity value based on the distance measure. Alternatively, a distance between the features of the face mesh in the first image frame and the features of the face mesh in the second image frame may be calculated to obtain a distance measure, so as to obtain the similarity value based on the distance measure. Alternatively, the distance measurements of the foregoing features may be combined, and a final similarity value may be obtained through processing. The distance may be a Euclidean distance, a cosine distance, or the like. This is not specifically limited in this application. It may be understood that the distance measure is used to measure a distance between individuals in space. A longer distance indicates a larger difference between individuals. A similarity measure is used to calculate a similarity between individuals. Contrary to the distance measure, a smaller value of the similarity measure indicates a smaller similarity between individuals and a larger difference between individuals.

In this embodiment of this application, a distance between the facial feature and/or the body posture feature of the target object may be calculated, to ensure that the face of the target object in the first image frame is similar to that in the second image frame, or ensure that the body posture of the target object in the first image frame is similar to that in the second image frame, or ensure that both the face and the body posture of the target object in the first image frame are similar to those in the second image frame.

In this embodiment of this application, a similarity error value of the target object between the first image frame and the second image frame may be calculated. To be specific, a distance between the facial feature of the target object and/or the body posture feature of the target object is calculated, and a similarity value is obtained based on the similarity error value. It may be understood that a larger similarity error value indicates a smaller similarity between individuals and a larger difference between individuals.

Step S43: Obtain to-be-switched image frames, where the to-be-switched image frames include the first image frame and the second image frame with the similarity value greater than or equal to a preset threshold.

In this embodiment of this application, if the similarity value is greater than or equal to the preset threshold, features of the target object in the first image frame and the second image frame are similar, for example, facial features and/or body postures are similar. To achieve a better effect, scenarios of the first image frame and the second image frame, or clothes, hairstyles, and the like of the target object in the first image frame and the second image frame may not be similar.

It may be understood that when the similarity value between the target object in the first image frame of the first video and the target object in the second image frame of the second video reaches the preset threshold, a pair of to-be-switched image frames may be obtained, including the first image frame and the second image frame. For example, in a process of performing switching processing on the first video and the second video, a plurality of pairs of to-be-switched image frames may be obtained. For example, if the similarity value between the target object of the first image frame A1 of the first video and the target object of the second image frame B1 of the second video is greater than the preset threshold, a pair of to-be-switched image frames is obtained, including the first image frame A1 and the second image frame B1. If the similarity value between the target object of the first image frame A2 of the first video and the target object of the second image frame B2 of the second video is greater than the preset threshold, a pair of to-be-switched image frames is obtained, including the first image frame A2 and the second image frame B2.

Figure 7A:
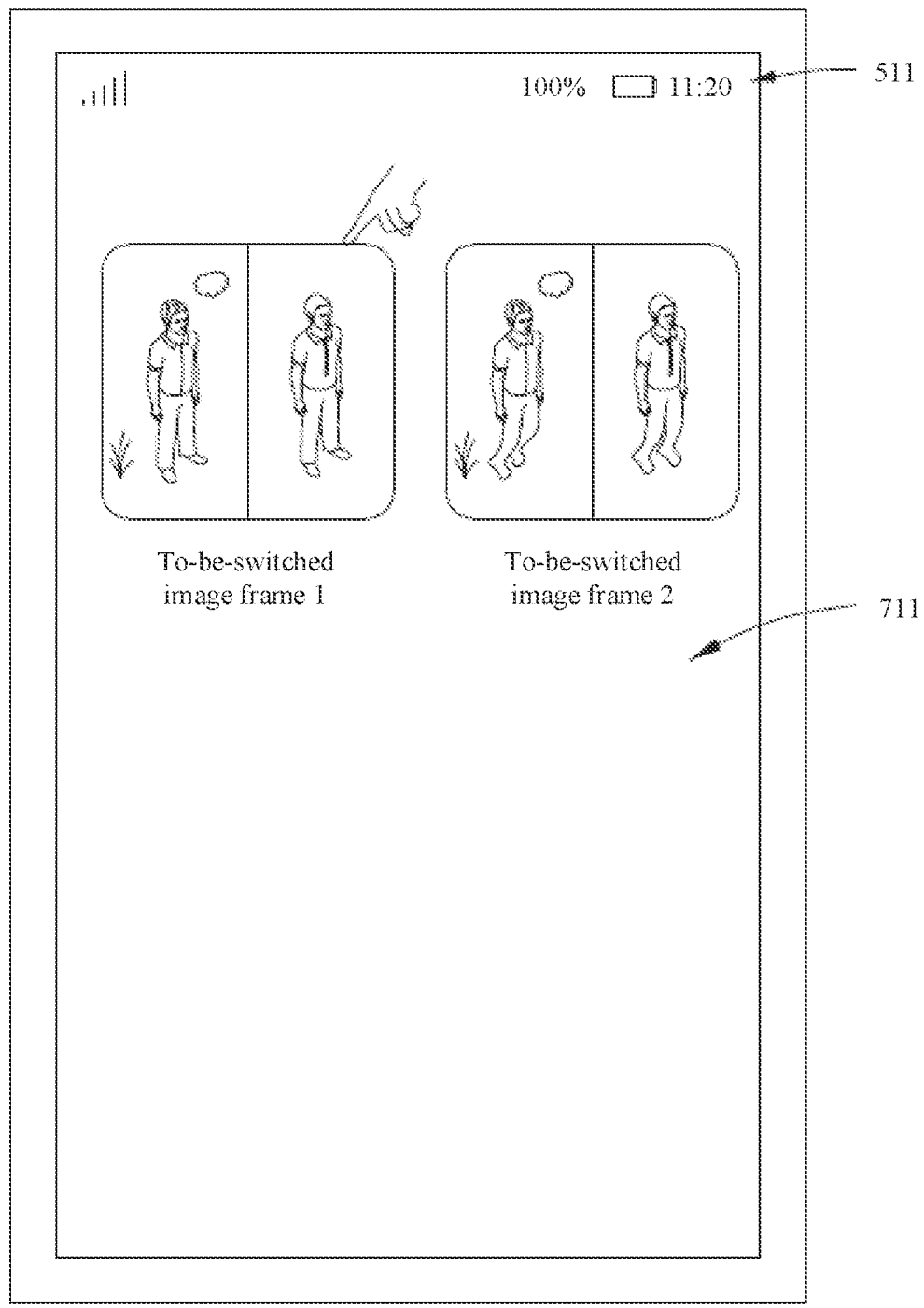
FIG. 7a is a schematic diagram of an editing interface according to an embodiment of this application.

For example, the editing interface may further include an image frame switching interface 711 (as shown in FIG. 7a), and the user may select to-be-switched image frames by using the image frame switching interface 711. As shown in FIG. 7a, a to-be-switched image frame 1 and a to-be-switched image frame 2 are presented on the image frame switching interface 711. It may be understood that the image frame switching interface 711 may include a plurality of pairs of to-be-switched image frames. When the user chooses to implement switching between the first video and the second video based on the to-be-switched image frame 1, the to-be-switched image frame 1 includes a first image frame A100 and a second image frame B200. In this case, an image frame connected after the first image frame A100 is the second image frame B200, or an image frame connected after the second image frame B200 is the first image frame A100.

Step S44: Switch the first image frame of the first video to the second image frame of the second video or switch the second image frame of the second video to the first image frame of the first video based on the to-be-switched image frames.

In this embodiment of this application, the switching the first video to the second video based on the to-be-switched image frames may be implemented as: implementing switching between the first video and the second video based on obtained to-be-switched image frames, or implementing switching between the first video and the second video based on to-be-switched image frames selected by the user.

In this embodiment of this application, the implementing switching between the first video and the second video based on the to-be-switched image frames may specifically include: obtaining, based on the to-be-switched image frames, a position of switching between the first video and the second video, and performing video switching based on the position of switching between the first video and the second video. For example, a pair of to-be-switched image frames includes a first image frame A10 and a second image frame B10, and switching between the first video and the second video is implemented based on the first image frame A10 and the second image frame B10. The first image frame A10 is connected to the second image frame B10, that is, an image frame after the first image frame A10 is the second image frame B10, or an image frame after the second image frame B10 is the first image frame A10. In this way, the second image frame B10 is switched to when the first image frame A10 is played, or the first image frame A10 is switched to when the second image frame B10 is played.

Figure 7B:
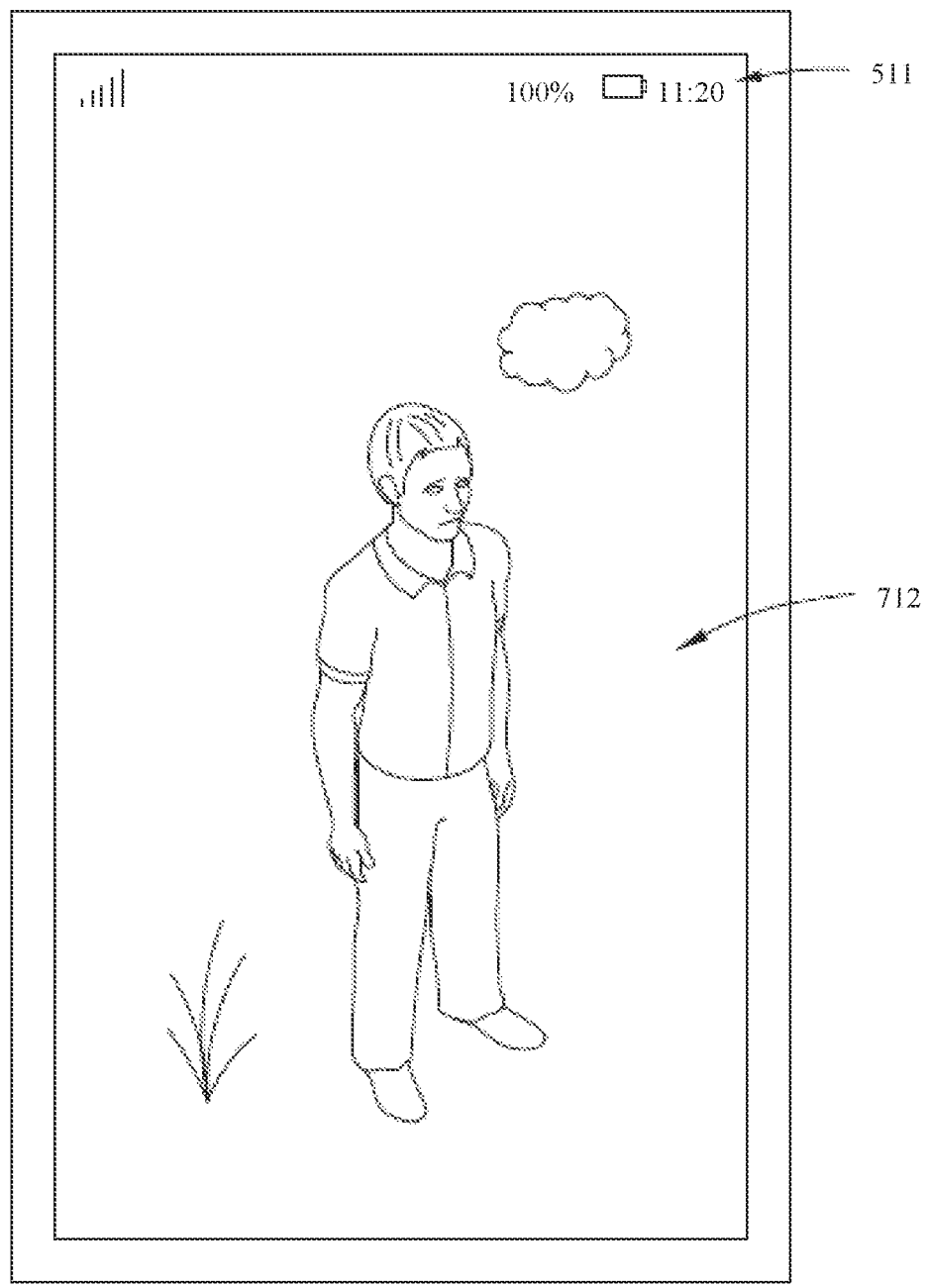
FIG. 7b is a schematic diagram of a first image frame image according to an embodiment of this application.
Figure 7C:
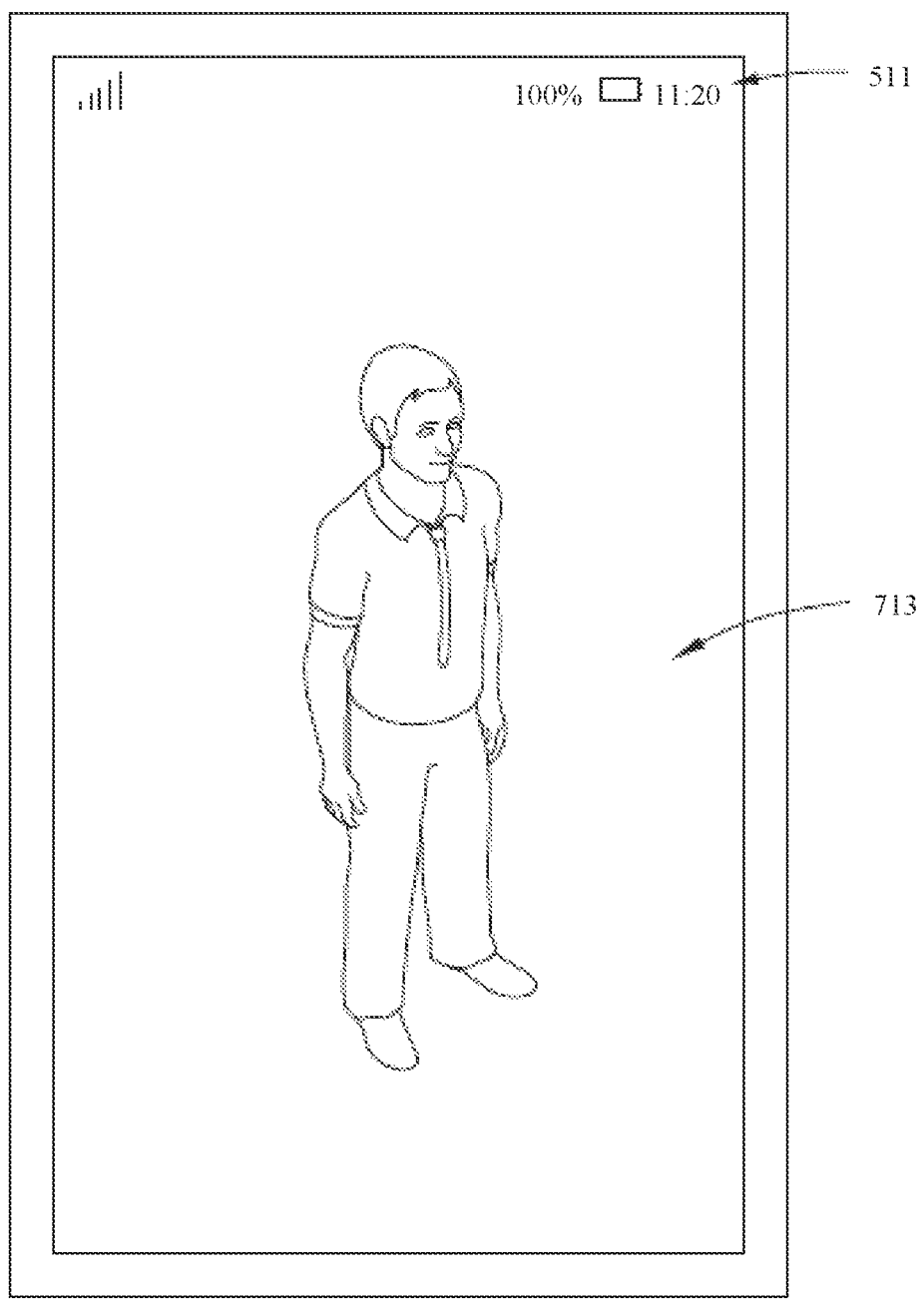
FIG. 7c is a schematic diagram of a second image frame image according to an embodiment of this application.

With reference to both FIG. 7b and FIG. 7c, an image of the first image frame is presented on a first image frame display interface 712 in FIG. 7b, and an image of the second image frame is presented on a second image frame display interface 713 in FIG. 7c. The image of the first image frame in FIG. 7b includes a target object, a grass, and a cloud, and the image of the second image frame in FIG. 7c includes a target object. A face and/or a body posture of the target object in the image of the first image frame are similar to a face and/or a body posture of the target object in the image of the second image frame, but scenarios are different. For example, clothes and backgrounds of the target object are different.

In a possible implementation, one video may be formed through combination based on the to-be-switched image frames, to implement switching between the first video and the second video. For example, if all obtained to-be-switched image frames are combined into one video, the first image frame and the second image frame are adjacent to each other in the video obtained after combination, and the video obtained after combination is different from both the first video and the second video.

In this embodiment of this application, to achieve a better effect, some image frames may be appropriately added. For example, two pairs of to-be-switched image frames are obtained. One pair of to-be-switched image frames includes a first image frame A10 and a second image frame B20, and the other pair of to-be-switched image frames includes a first image frame A31 and a second image frame B41. In this case, one video may be formed through combination based on the to-be-switched image frames, to obtain first image frames A1 to A9 before the first image frame A10, second image frames B21 to B40 after the second image frame B20, and a first image frame after the first image frame A31. The first image frames A1 to A10, the second image frames B20 to B41, the first image frame A31, and the subsequent first image frames may be combined into one video. For example, sequentially playing the video is displaying and playing the video starting from the first image frame A1, and sequentially playing and displaying the video to the first image frame A10, and switching to the second image frame B20 after the first image frame A10 is played and displayed, instead of continuing to play and display the first image frame A11, then playing and displaying the second image frames B21 to B40 that are after the second image frame B20, switching to the first image frame A31 after the second image frame B41 is played and displayed, and then playing and displaying the image frames after the first image frame A31.

In this embodiment of this application, the target objects of the image frames in the to-be-switched image frames may be aligned, for example, a position of the target object in the first image frame and a position of the target object in the second image frame are aligned in the image picture, so that when the second image frame is switched to after the first image frame is displayed, the user visually feels that the target object does not change greatly.

It may be understood that, when the to-be-processed videos include three video clips, a pair of to-be-switched image frames of the video 1 and the video 2 may be obtained, then a pair of to-be-switched image frames of the video 2 and the video 3 are obtained, and then a pair of to-be-switched image frames of the video 3 and the video 1 are obtained.

In this embodiment of this application, video switching may be automatically implemented by using the video switching method. The user only needs to input a to-be-processed video to determine the target object, so that video switching can be automatically implemented, and video switching is automatically performed based on the features of the target object, to reduce wastes of manpower and time.

Figure 8:
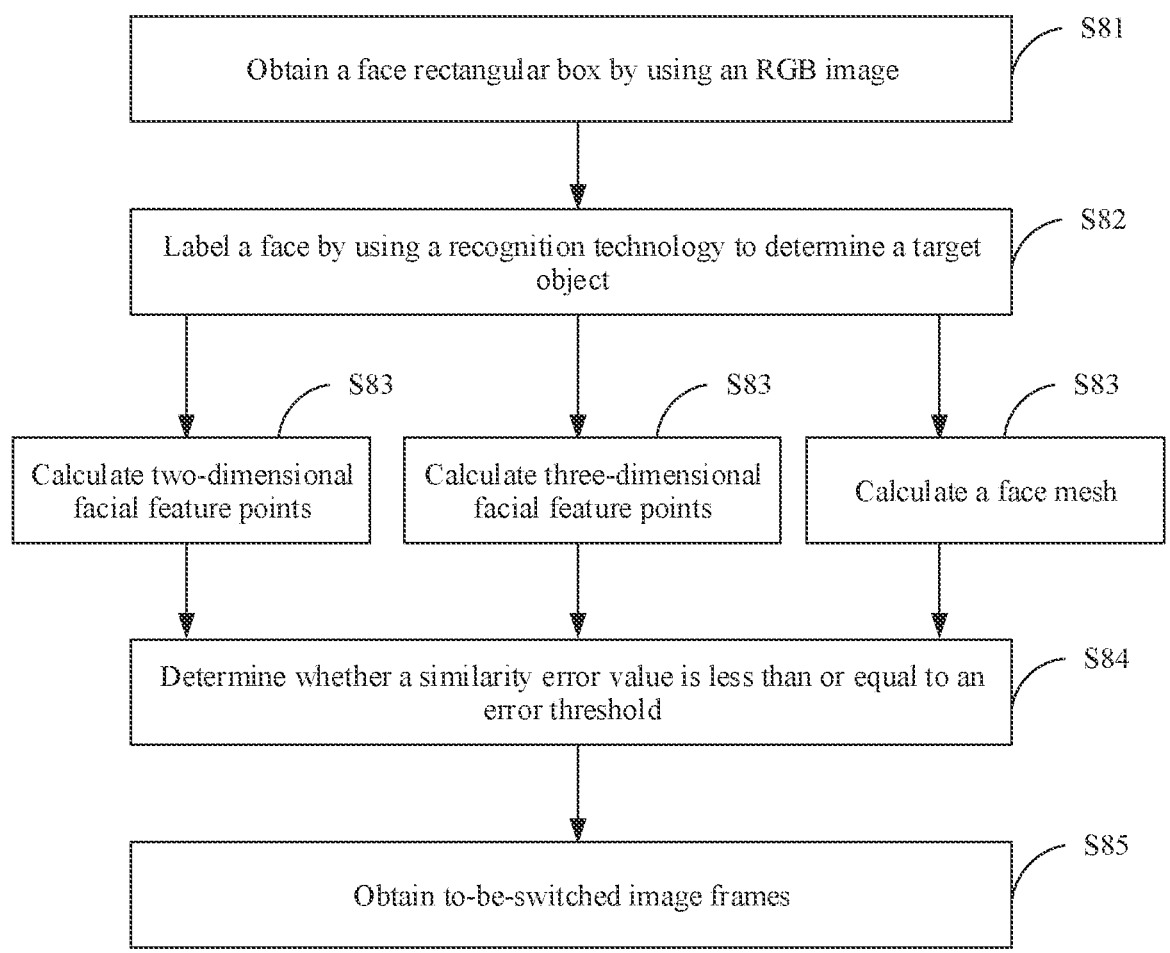
FIG. 8 is a schematic flowchart of another video switching method according to an embodiment of this application.

FIG. 8 is a schematic flowchart of video switching according to an embodiment of this application. Description is provided by using an example in which a target object is a face of a person.

Step S81: Obtain a face rectangular box by using an RGB image.

In this embodiment of this application. RGB images of a first image frame and a second image frame are obtained, and image processing is performed on the two RGB images to obtain face rectangular boxes. To be specific, a region in which a face in each of the two RGB images is located is identified, and the face is framed by using the face rectangular box.

Step S82: Label the face by using a recognition technology to determine the target object.

In this embodiment of this application, the face in the face rectangular box is recognized by using the facial recognition technology, for example, the recognized face is labeled by using a Face ID technology, to determine a person to which the face belongs in a video. A video switching apparatus may determine, based on a position of the face, the face located in the middle of a picture as the target object, or the user may specify a person as the target object.

Step S83: Calculate two-dimensional facial feature points and/or three-dimensional facial feature points and/or a face mesh.

In this embodiment of this application, after determining that the target objects in the first image frame and the second image frame are a same person in step S82, a similarity of the target object between the first image frame and the second image frame is calculated. Two-dimensional facial feature points of the target object in the first image frame are obtained, two-dimensional facial feature points of the target object in the second image frame are obtained, and then a distance between the two-dimensional feature points of the target object in the two image frames is calculated, to obtain a similarity error value, and determine a difference value of the face of the target object between the two image frames; and/or three-dimensional facial feature points of the target object in the first image frame are obtained, three-dimensional facial feature points of the target object in the second image frame are obtained, and then a distance between the three-dimensional feature points of the target object in the two image frames is calculated, to obtain a similarity error value, and determine a difference value of the face of the target object between the two image frames; and/or a face mesh point of the target object in the first image frame is obtained, a face mesh point of the target object in the second image frame is obtained, and then a distance between the mesh points of the target object in the two image frames is calculated, to obtain a similarity error value, and determine a difference value of the face of the target object between the two image frames. The similarity error value may be obtained based on the difference value between the two-dimensional feature points and/or the difference value between the three-dimensional feature points and/or the difference value between the mesh points.

Step S84: Determine whether the similarity error value is less than or equal to an error threshold.

In this embodiment of this application, it is determined whether the similarity error value is less than or equal to the error threshold, so as to determine the similarity of the target object between the two image frames.

Step S85: Obtain to-be-switched image frames.

In this embodiment of this application, if the similarity error value between the first image frame and the second image frame is less than or equal to the error threshold, the two image frames are selected to obtain the to-be-switched image frames. Then, video switching is performed based on the to-be-switched image frames.

In this embodiment of this application, if the first image frame and the second image frame are from a same video clip, based on that a person has quite close expressions and postures within a specified time, to achieve a best effect, a group of image frames with a smallest similarity error value is found within a specific time interval as the to-be-switched image frames. The user may find one or more pairs of to-be-switched image frames that the user likes in these to-be-switched image frames based on a preference of the user, and the video switching apparatus automatically aligns faces in two image frames completely, and implements a switching effect, so that the two video clips are seamlessly connected in a smart manner, and the two switched image frames have a high similarity of faces and a cool effect of environment switching.

A person of ordinary skill in the art may be aware that, units, algorithms, and steps in the examples described with reference to embodiments disclosed in this specification can be implemented in a form of electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The descriptions of procedures corresponding to the foregoing accompanying drawings have respective focuses. For a part that is not described in detail in a procedure, refer to related descriptions of another procedure.

All or some of the foregoing embodiments may be implemented by using software, hardware, firmware, or any combination thereof. When software is used to implement the embodiments, all or some of the embodiments may be implemented in a form of a computer program product. A computer program product for implementing video switching includes one or more computer instructions for performing video switching. When the computer program instructions are loaded and executed on a computer, all or some of the procedures or functions in FIG. 4 and FIG. 6 are generated based on embodiments of this application.

The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a data subscriber line (digital subscriber line, DSL)) or wireless (for example, infrared, wireless, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid state disk (solid state disk. SSD)), or the like.

A person of ordinary skill in the art may understand that all or some of the steps of the embodiments may be implemented by using hardware or a program indicating related hardware. The program may be stored in a computer-readable storage medium. The storage medium mentioned above may be a read-only memory, a magnetic disk, an optical disc, or the like.

The foregoing descriptions are merely embodiments provided in this application, but are not intended to limit this application. Any modification, equivalent replacement, improvement, or the like made without departing from the spirit and principle of this application shall fall within the protection scope of this application.

What is claimed is:

1. A video switching method, comprising:
    recognizing a first image frame and a second image frame, wherein the first image frame is from a first video, and wherein the second image frame is from a second video;
    displaying an editing interface comprising an object presented after recognizing the first image frame and the second image frame;
    selecting a target object in response to a selection of a user;
    calculating a similarity of the target object between the first image frame and the second image frame to obtain a similarity value by:
        obtaining, in the first image frame and the second image frame, two-dimensional features of the target object, three-dimensional features of the target object, and a mesh of the target object;
        calculating a first distance between the two-dimensional features in the first image frame and the second image frame;
        calculating a second distance between the three-dimensional features in the first image frame and the second image frame;
        calculating a third distance between features of the mesh in the first image frame and the second image frame; and
        combining the first distance, the second distance, and the third distance to obtain the similarity value;
    obtaining to-be-switched image frames comprising the first image frame and the second image frame with the similarity value greater than or equal to a preset threshold; and
    switching, based on the to-be-switched image frames, the first image frame to the second image frame or switching the second image frame to the first image frame.

2. The method of claim 1, wherein the features of the target object comprise at least one of a facial feature of the target object or a body posture feature of the target object.

3. The method of claim 1, wherein the editing interface further comprises one or more pairs of the to-be-switched image frames for selection by the user, and wherein switching, based on the to-be-switched image frames, the first image frame to the second image frame or the second image frame to the first image frame comprises:
    switching, in response to the one or more pairs of the to-be-switched image frames selected by the user, the first image frame to the second image frame; or
    switching, in response to the one or more pairs of the to-be-switched image frames selected by the user, the second image frame to the first image frame.

4. The method of claim 1, further comprising:
    obtaining a switching position between the first video and the second video based on the to-be-switched image frames; and
    performing video switching based on the switching position.

5. The method of claim 1, further comprising generating a third video based on the to-be-switched image frames.

6. The method of claim 1, further comprising performing alignment of the target object in the to-be-switched image frames.

7. The method of claim 6, wherein performing the alignment comprises aligning a position of the target object in the first image frame and a position of the target object in the second image frame in an image picture.

8. An electronic device, comprising:
    a memory configured to store computer instructions; and
    one or more processors coupled to the memory and configured to execute the computer instructions to cause the electronic device to:
        recognize a first image frame and a second image frame, wherein the first image frame is from a first video, and wherein the second image frame is from a second video;
        display an editing interface comprising an object presented after recognizing the first image frame and the second image frame;
        select a target object in response to a selection of a user;
        calculate a similarity of the target object between the first image frame and the second image frame to obtain a similarity value by:
            obtaining, in the first image frame and the second image frame, two-dimensional features of the target object, three-dimensional features of the target object, and a mesh of the target object;
            calculating a first distance between the two-dimensional features in the first image frame and the second image frame;
            calculating a second distance between the three-dimensional features in the first image frame and the second image frame;
            calculating a third distance between features of the mesh in the first image frame and the second image frame; and
            combining the first distance, the second distance, and the third distance to obtain the similarity value;
        obtain to-be-switched image frames comprising the first image frame and the second image frame with the similarity value greater than or equal to a preset threshold; and
        switch, based on the to-be-switched image frames, the first image frame to the second image frame or switch the second image frame to the first image frame.

9. The electronic device of claim 8, wherein the features of the target object comprise at least one of a facial feature of the target object or a body posture feature of the target object.

10. The electronic device of claim 8, wherein the editing interface further comprises one or more pairs of the to-be-switched image frames for selection by the user, and wherein the one or more processors are further configured to execute the computer instructions to cause the electronic device to:
switch, in response to the one or more pairs of the to-be-switched image frames selected by the user, the first image frame to the second image frame; or
switch, in response to the one or more pairs of the to-be-switched image frames selected by the user, the second image frame to the first image frame.

11. The electronic device of claim 8, wherein the one or more processors are further configured to execute the computer instructions to cause the electronic device to:
obtain a switching position between the first video and the second video based on the to-be-switched image frames; and
perform video switching based on the switching position.

12. The electronic device of claim 8, wherein the one or more processors are further configured to execute the computer instructions to cause the electronic device to generate a third video based on the to-be-switched image frames.

13. The electronic device of claim 8, wherein the one or more processors are further configured to execute the computer instructions to cause the electronic device to perform alignment of the target object in the to-be-switched image frames.

14. The electronic device of claim 13, wherein the one or more processors are further configured to execute the computer instructions to cause the electronic device to perform the alignment by aligning a position of the target object in the first image frame and a position of the target object in the second image frame in an image picture.

15. A computer program product comprising instructions that are stored on a non-transitory computer-readable medium and that, when executed by one or more processors, cause an electronic device to:
recognize a first image frame and a second image frame;
display an editing interface comprising an object presented after recognizing the first image frame and the second image frame;
select a target object in response to a selection of a user;
calculate a similarity of the target object between the first image frame and the second image frame to obtain a similarity value by:
obtaining, in the first image frame and the second image frame, two-dimensional features of the target object, three-dimensional features of the target object, and a mesh of the target object;
calculating a first distance between the two-dimensional features in the first image frame and the second image frame;
calculating a second distance between the three-dimensional features in the first image frame and the second image frame;
calculating a third distance between features of the mesh in the first image frame and the second image frame; and
combining the first distance, the second distance, and the third distance to obtain the similarity value, wherein the first image frame is from a first video, and wherein the second image frame is from a second video;
obtain to-be-switched image frames comprising the first image frame and the second image frame with the similarity value greater than or equal to a preset threshold; and
switch, based on the to-be-switched image frames, the first image frame to the second image frame or switch the second image frame to the first image frame.

16. The computer program product of claim 15, wherein the editing interface further comprises one or more pairs of the to-be-switched image frames for selection by the user, and wherein the instructions, when executed by the one or more processors, further cause the electronic device to:
switch, in response to the one or more pairs of the to-be-switched image frames selected by the user, the first image frame to the second image frame; or
switch, in response to the one or more pairs of the to-be-switched image frames selected by the user, the second image frame to the first image frame.

17. The computer program product of claim 15, wherein the instructions, when executed by the one or more processors, further cause the electronic device to:
obtain a switching position between the first video and the second video based on the to-be-switched image frames; and
perform video switching based on the switching position.

18. The computer program product of claim 15, wherein the instructions, when executed by the one or more processors, further cause the electronic device to generate a third video based on the to-be-switched image frames.

19. The computer program product of claim 15, wherein the instructions, when executed by the one or more processors, further cause the electronic device to perform alignment of the target object in the to-be-switched image frames.

20. The computer program product of claim 19, wherein the instructions, when executed by the one or more processors, further cause the electronic device to perform the alignment by aligning a position of the target object in the first image frame and a position of the target object in the second image frame in an image picture.

* * * * *